SOUND RECORDING DISC HANDLER

Filed Sept. 26, 1963 4 Sheets-Sheet 1

INVENTOR
Thomas R. Morrison

BY Walter G. Finch
ATTORNEY

INVENTOR
Thomas R. Morrison
BY Walter G. Finch
ATTORNEY

INVENTOR
Thomas R. Morrison

BY Walter G. Finch
ATTORNEY

Nov. 1, 1966 T. R. MORRISON 3,282,589
SOUND RECORDING DISC HANDLER
Filed Sept. 26, 1963 4 Sheets-Sheet 4
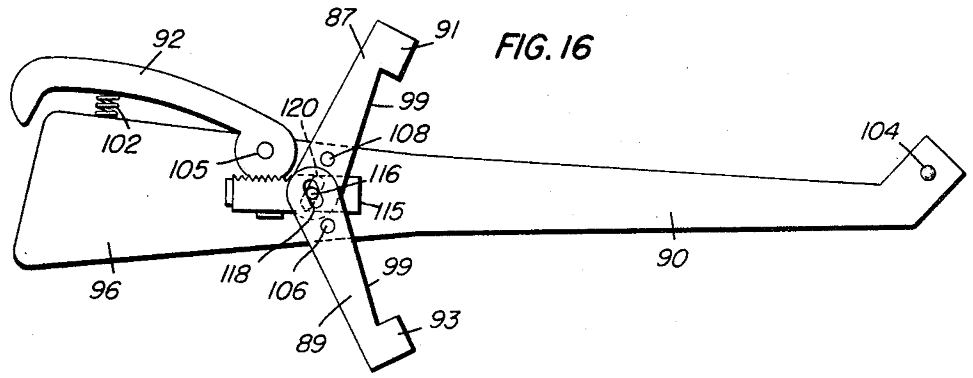
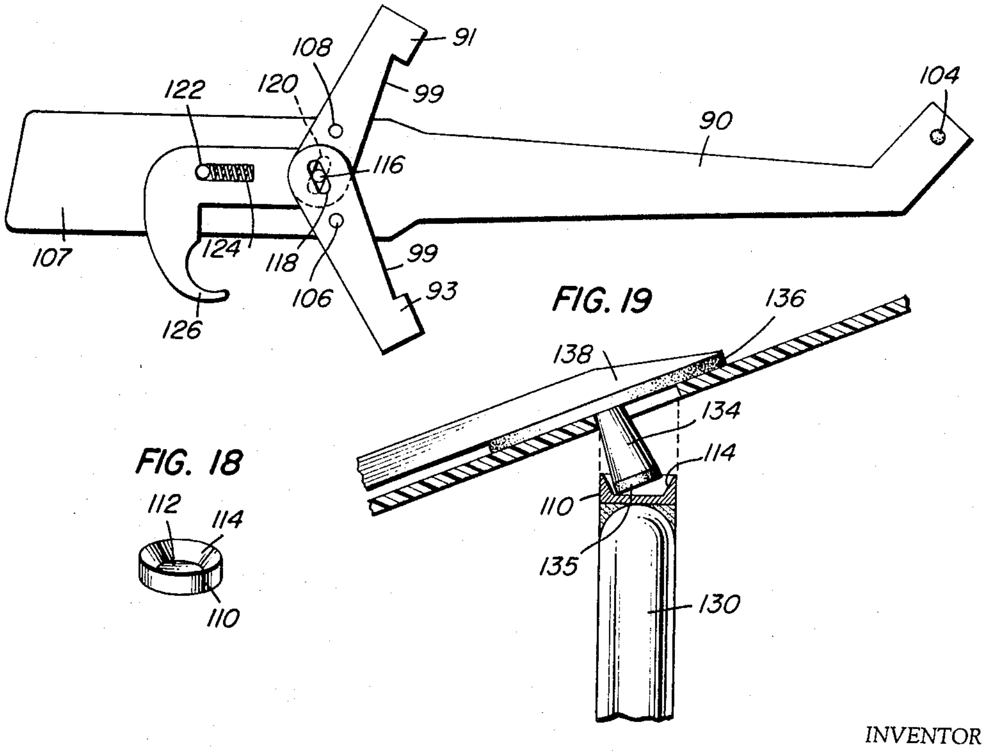
FIG. 17, FIG. 18, FIG. 19
INVENTOR
Thomas R. Morrison
BY Walter J. Finch
ATTORNEY 3,282,589

SOUND RECORDING DISC HANDLER

Thomas R. Morrison, 1721 Lansing Road, Glen Burnie, Md.

Filed Sept. 26, 1963, Ser. No. 311,850
9 Claims. (Cl. 274—1)

This invention relates generally to tools, and more particularly it pertains to a device for handling sound record discs without placing the fingers on the grooved area of the discs.

The prior art discloses devices which grip the edges of record discs as used in commercial mechanical record changers. However, no simple workable device has been developed for home use.

As background information, it is the unanimous opinion of experts in the high-fidelity sound field that the grooved area of a record disc should never be touched by human hands. Such touching with hands, deposits perspiration and grease upon and into the grooves. Dust and abrasive particles attach themselves firmly to the deposited grease. Grease-held materials cannot be removed from the grooves as normally occurs due to the action of the stylus and the gentle brushing of the several varieties of commercially available brushes.

Instead, these grease-held particles remain in the grooves and abrade the extremely delicate texture of the grooves which produce the sound. Consequently, when the record is repeatedly played, the quality of the sound reproduced is severely degraded, particularly with respect to high frequencies.

Additionally, the grease-held particles create immediate distortion through the generation of pops, crackles, and hisses in the reproduced sound. Also, touching the recorded surface increases the incidence of surface scratches.

The prior recommended methods of handling a disc consist of placing the fingers on the label area (center of disc) and the thumb on outer edge of the disc, or, if possible, handling by pressure at the outer edges only. The handling problem becomes most accurate when inserting the disc in the paperboard jacket storage container or removing it therefrom.

This insertion or removal operation is probably the most awkward and uncomfortable gesture performed by a person. The removal operation consists of fanning open the jacket container with one hand, inserting the other hand into the side of the jacket to place the fingers on the label area, and then withdrawing the record by friction between the fingers and the label. As the record is withdrawn, it is dangerously balanced on the fingertips and is an imminent candidate for dropping.

It is an object of this invention, therefore, to provide a tool for gripping a record disc while it is still in its jacket and withdrawing it under firm control. Once withdrawn the record remains under firm control in any orientation until voluntarily released. Contact between this tool and the record disc occurs only at the label area and at two points on the unrecorded outer edge.

Another object of this invention is to provide a tool for inserting a record disc into its storage jacket.

Another object of this invention is to provide a tool or device which has special utility in extracting a disc from, and inserting the disc into a paperboard jacket used for stowing the disc.

Other objects and attendant advantages of this invention will become more apparent and understood from the following detailed specification and accompanying drawings in which:

FIG. 16 is a plan of another embodiment of the disc handler tool;

FIG. 17 is a plan of still another embodiment of the disc handler tool incorporating additional features of the invention;

FIG. 18 is a perspective of a cup; and

FIG. 19 is a side elevation, partially in section, showing the cup of FIG. 17 adapted to a turntable spindle.

Figure 1:
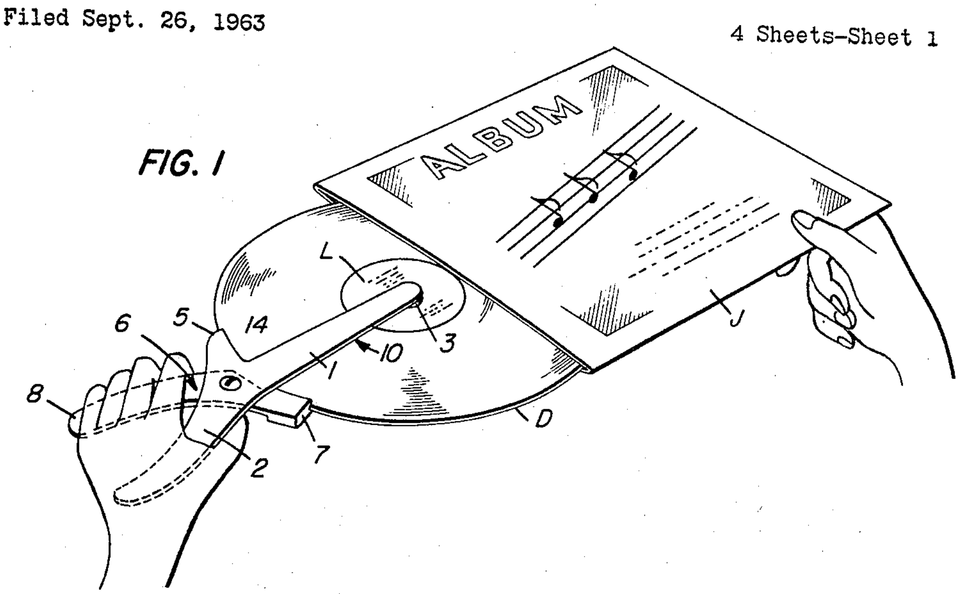
FIG. 1 is a perspective view illustrating the removal of a record disc from its protective jacket with a preferred form of the novel tool, incorporating features of this invention.
Figure 2:
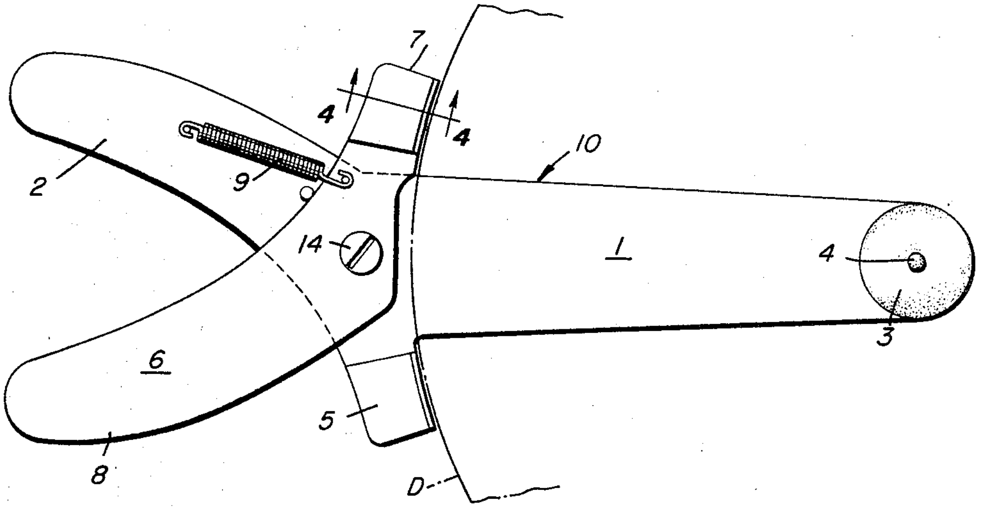
FIG. 2 is an underside plan view to a larger scale of the tool shown in FIG. 1.
Figure 3:
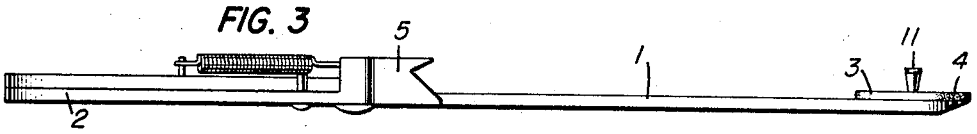
FIG. 3 is a side elevation of FIG. 2.

With reference to FIGS. 1, 2 and 3, the preferred embodiment of the record handling tool 10 consists of an arm 1 having at one end a handle 2, and at the other end a contact pad 3 and spindle 4. A positioner and gripper 5 is located on the arm 1 intermediate the contact pad 3 and the handle 2. A clamp arm 6 is pivoted at 14 to the arm 1 in scissors fashion. The clamp arm 6 also has a positioner and gripper 7 and a handle 8.

The conjunction of the two pivoting pieces 1 and 6 is such that when the handles 2 and 8 thereof are squeezed, the two positioners and grippers 5 and 7 tend to approach each other. A return spring 9 normally maintains the handles 2 and 8 and the positioners and grippers 5 and 7 in their fully open position.

Figure 5:
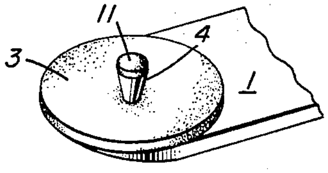
FIG. 5 is a fragmentary perspective of the contact pad and spindle of the tool.

As shown in detail in FIG. 5, the contact pad 3 consists of a disc of felt or the like cemented to the end of the arm 1. The function of this contact pad 3 is to provide a surface against which only the label area L of the record disc D may bear. The spindle 4 is centered in the contact pad 3. The spindle 4 is tapered from a larger diameter at its outer end to smaller diameter at its inner end, or is cylindrical and is inclined toward the handle. The taper or the inclination is provided in order that, when the record disc D is secured, no tendency will exist for the spindle 4 to escape the record disc hold.

The spindle 4 is tipped with a lint free felt pad 11 in order that this end shall not mar the recorded surface of the record disc in case of accidental contact thereagainst during introduction of the device.

Figure 4:
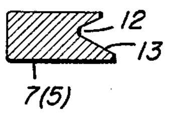
FIG. 4 is a cross section taken on line 4—4 of FIG. 2 showing details of a positioner and gripper.

FIG. 4 depicts in cross section the positioners and grippers 5 and 7 showing a groove 12 which mates in angle and radius with the specific size record for which the device is manufactured. The ramp or slope 13 provides for gross inaccuracy in positioning the edge of the disc in the groove 12. The functional operation of the record handler in removing a record disc from its storage jacket J will now be explained. First, the record storage jacket mouth is fanned open by pressure at its edges. Then, the arm 1 is inserted into the opening between the jacket and the disc in correct orientation so that the spindle 4 and contact pad 3 are facing the record disc. The handles 2 and 8 are in their fully open position.

Next, both the positioner and grippers 5 and 7 are brought into contact with the outer edge of the disc in such a manner that the edge of the disc fits into the grooves 12 as described in connection with FIG. 4. This action places the spindle 4 directly adjacent to the hole in the center of the record disc D.

The end of the arm 1 containing the spindle 4 is then moved fully toward the record disc by appropriate tilting of the handles 2 and 8. This inserts the spindle 4 through the hole in the center of the record disc and brings the contact pad 3 into contact with the label area L of the record disc.

The handles are then squeezed, creating a gripping action in the triangle formed by the supporting contact of grooves 12 of the two positioners and grippers 5 and 7, respectively, and that of the spindle 4. The disc hole is firmly secured by friction between it and the spindle 4 and by the taper or the inclination of the spindle as previously mentioned. The triangular suspension so formed is completely secure and the record can be dislodged only by releasing the handles.

The record disc is finally extracted from the storage jacket by pulling on the handles 2 and 8. Once removed from its storage jacket, the record disc can be safely transported in the grip of this tool. Alternatively, once outside the storage jacket, the record disc can be handled by hand pressure at its outer edges.

In order to remove the record handler from the record disc, the pressure on the handles, 2 and 8 is then released. The return spring 9 restores the handles 2 and 8 and the positioners and grippers 5 and 7 to their fully open position. The end of the arm 1 containing the spindle 4 is moved away from the record disc by manipulation of the handles 2 and 8; and the positioners and grippers 5 and 7 are removed from contact with edge of the record disc.

The use of this device to insert a record disc into its storage jacket is essentially the inverse of the steps outlined above.

Figures 6, 7, 9, 10:
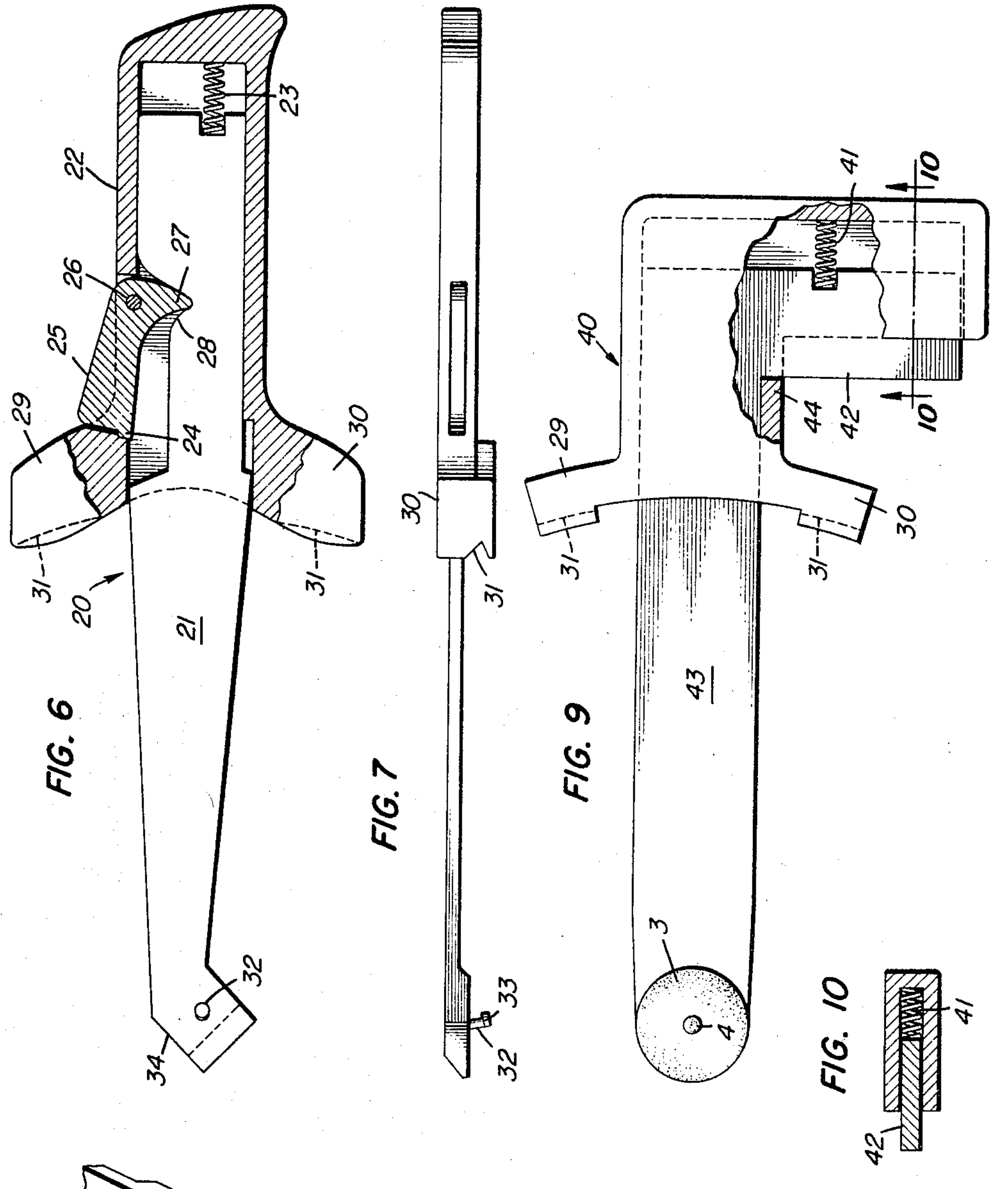
FIG. 6 is a plan view, partly in section, of a second embodiment of a record handler tool.
FIG. 7 is a side elevation of FIG. 6.
FIG. 9 is an plan view, partly broken away, of a third embodiment of the record handler tool incorporating features of this invention.
FIG. 10 is a cross section of the handle of the tool depicted in FIG. 9 taken of line 10—10 thereof.
Figure 8:
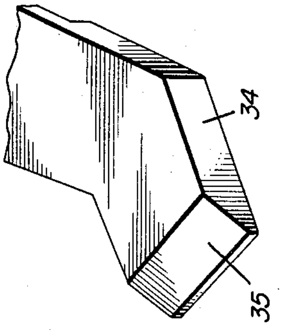
FIG. 8 is an enlarged detail view of the insertion end of the tool of FIGS. 6 and 7.

With reference now to FIGS. 6, 7 and 8, a second embodiment of the novel record handling tool 20 consists of an arm 21 which partly slides in a hollow handle 22 being spring-loaded to eject by a concealed compression coil spring 23. Arm 21 is retained from completely ejecting by a stop 24 on a pivoted thumb lever 25. This thumb lever 25 is partly exposed from the side of the hollow handle 22 and partly extends within. The innermost end of the lever 25 beyond the pivot 26 is curved more or less transversely of the handle and has a point 27 engaging a recessed notch 28 in the side of the concealed portion of the arm 21.

Opposite sides of the handle 22 diverge to form a pair of spaced positioners and grippers 29 and 30. As best shown in FIG. 7, the positioners and grippers 29 and 30 are formed with a record edge engaging groove 31 and effectively provide two of the points of the support triangle as mentioned previously in connection with the first operation of the first embodiment of my invention. The third point of the support triangle is represented by the spindle 32 on the face of the outer end of the arm 21. It will be noted the spindle 32 has an enlarged tip 33, preferably of soft material such as rubber, and may be inclined toward the handle 22 as shown.

This same end of the handle 22 may be given an offset bend 34 from the centerline and beveled as at 35. This facilitates the insertion of the tool 20 into the record protective jacket.

In operation, after insertion of the offset end of the tool 20 into the jacket the grooves 31 are positioned against the record disc edge. Spindle 32 is dropped into the spindle hole of the record by manipulation of the handle as explained in the first operation of the first embodiment of my invention. The thumb lever is then actuated to withdraw the arm 21 into the handle 22; thereby capturing the record disc in a three-point grip formed between the spindle 32 and two grooves 31. The record is then easily freed from its jacket.

FIG. 9 depicts a pistol grip model of the tool 40. The detail in FIG. 10 illustrates the spring 41 which urges the arm 43 and its trigger 42 outwardly against a stop 44. The action is otherwise the same as described previously for the corresponding referenced parts.

Figure 11:
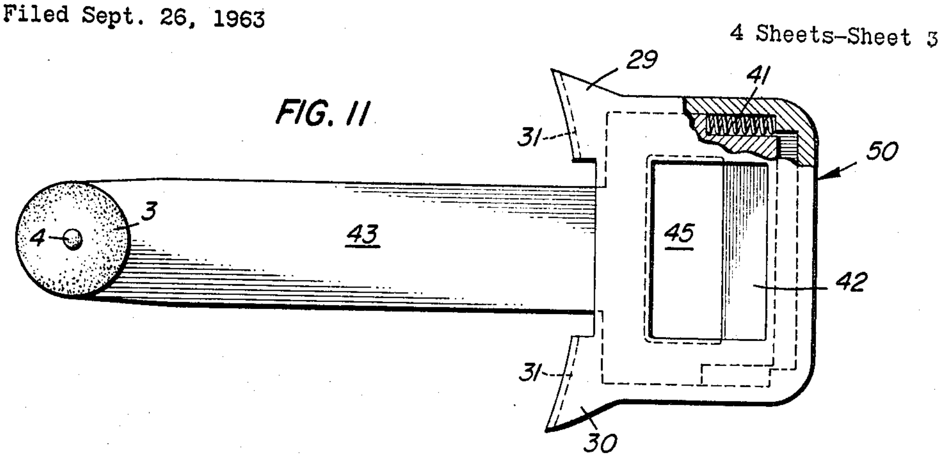
FIG. 11 is a plan view, partly broken away, of a fourth embodiment of the record handler tool featuring a modified gripper handle.

The embodiment 50 of FIG. 11 is much the same as that of FIG. 9 except that the operators fingers are inserted through a rectangular aperture 45 as in a spade handle.

Figure 12:
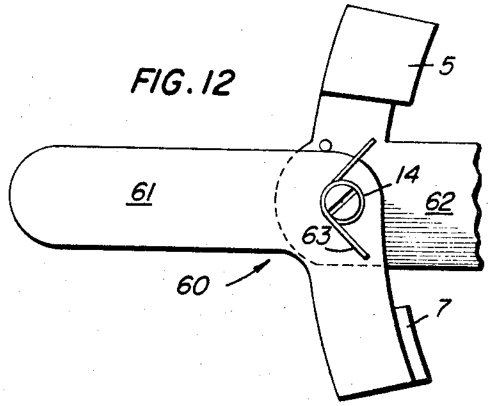
FIG. 12 is a detail of a modified gripper handle of a gravity assisted record tool.

The scissors operation of positioners and grippers 5 and 7 as in embodiment reference 10 can be augmented by utilizing the force of gravity to help retain the record in the tool 60 depicted in FIG. 12. The tool 60 is held by the handle 61 with the positioner 5 uppermost. Thus, the weight of the record engaged on the spindle end (not shown) of arm 62 will cause pivoting thereof about the pivot 14 and against the urging of return spring 63 so as to tend to bring the positions and grippers 5 and 7 closer together as recited in connection with the first embodiment.

Figure 13:
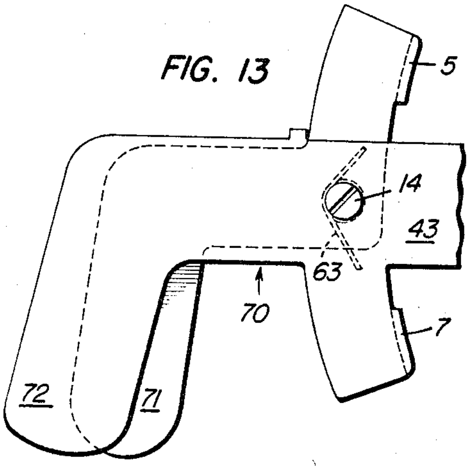
FIG. 13 is a detail of a pistol grip-scissors model of a record tool.

The pistol grip may also be adapted to the scissors type tool 10 as in the embodiment 70, FIG. 13. The two curved grip handles 71 and 72 when squeezed together bring their respectively associated positioner grippers 5 and 7 closer together in the required operation.

Figures 14, 15:
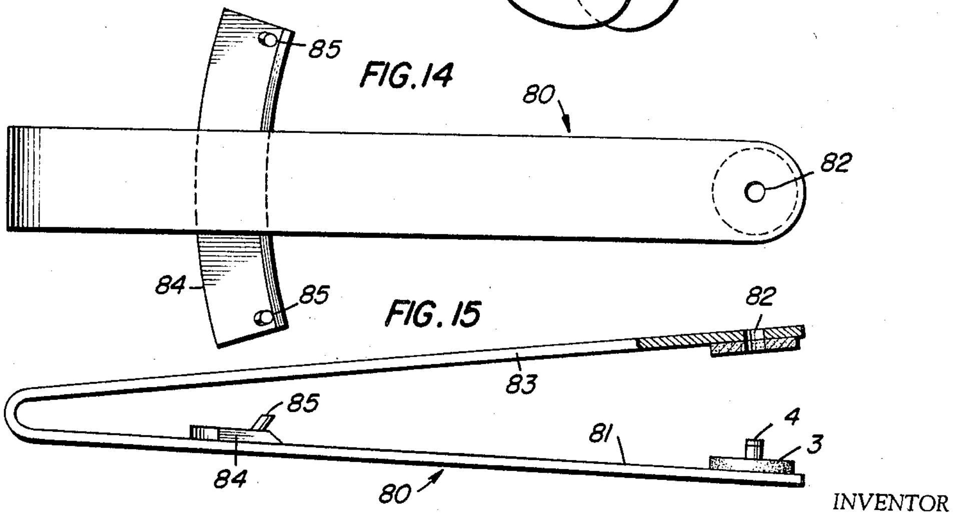
FIGS. 14 and 15 are plan and side elevation views respectively of a tong model record handling tool.

In FIGS. 14 and 15 a tong model of record handling tool 80 is shown. Here the pad 3 and spindle 4 are on the end of one flexing arm 81. The spindle 4 need not be tapered or bent in this case because it becomes engaged by a padded hole 82 in the other flexing arm 83 of the tong.

A bridge 84 is secured across the first arm 81 and is provided at each end with a record edge positioning pin 85.

Although the gripping action is lacking in this embodiment of the tool 80, the triangle positioning feature is present and the record is adequately held by the pads of the compressed arms 81 and 83 and by the engaged spindle 4 with its mated spindle hole.

In the embodiments of the invention of FIGS. 1 to 12, a pin 92 is provided which prevents the handles from opening too far.

FIGS. 18 and 19 illustrate a small cup 110 having an inner base 114 with tapering side wall 112 which is supplied with the record handler tool and which is cemented to the tip of the spindle 130 of the turntable. This cup 110 is a receptacle for maintaining the spindle of a record handling tool of this invention in alignment with the turntable spindle while placing a record on the turntable. using this cup 110, the record is removed from its jacket in the manner described and is carried to the turntable in the grip of the tool. The user inverts the record over the turntable while allowing the tip 135 of the tool spindle 134 to enter the depression defined by surfaces 112 and 114 of the cup 110. When the trigger of the tool is released, alignment between the two spindles 134 and 130 is maintained. The record, therefore, drops onto the turntable without ever having been touched by the hands.

FIGS. 16 and 17 illustrate two additional configurations of the record handling tool. In these embodiments of the invention, both shoulders 99 at the record edge are made to move outwardly in order to achieve gripping action of the record.

In the record handling tool of FIG. 16, the arms 87 and 89 wth cylindrical ends 91 and 93, respectively, are pivoted by pins 108 and 106, respectively, to the arm 90. These arms 87 and 89, in turn, are provided with elongated slots (corresponding to slots 118 and 120 of FIG. 17) at their ends for a pivot pin (116 of FIG. 17) operated by a ratchet and actuating lever 92 for moving the arms 87 and 89 as desired. The actuating lever 92 is connected to the handle 96 by a return spring 102.

In the record handling tool of FIG. 17, a direct pull trigger 126 having a return spring 124 positioned in a recess 122 is provided for operating the arms 87 and 89. The other components of the tool are similar to those of the tool of FIG. 16 and similarly designated.

Obviously many modifications and variations of the present invention are possible in light of the above teachings. It is, therefore, to be understood that within the scope of the appended claims the invention may be practiced otherwise than as specifically described.

What is claimed is:

1. A phonograph record handling device, comprising first means engaging the spindle hole of a phonograph record, a plurality of second means operatively connected with said first means and engaging the periphery of said record at spaced points, means urging at least one of said second means towards said first means to effect a triangular grip on said record permitting handling of said record without touching its recording grooves, and a member having an upwardly facing cavity mounted in the top of said spindle of a record turntable, said first means being engageable in said upwardly facing cavity to facilitate loading said record into said turntable.

2. A phonograph record handling device, comprising means including an elongated member having an element engaging the spindle hole of a phonograph record and a first handle spaced from said element, a second handle pivotally connected with said first handle, said first and second handles having means engaging the periphery of said record at spaced points and arranged to grip said record at said spaced points when said first and second handles are pivoted one towards the other, whereby said record is triangularly gripped to permit handling thereof without touching the recording grooves.

3. The phonograph record handling device as recited in claim 2, wherein said first and second handles are arranged in pistol grip fashion.

4. The phonograph record handling device as recited in claim 2 and additionally, means biasing said first and second handles apart.

5. A phonograph record handling device, comprising means including a hollow handle member having oppositely diverging portions engaging the periphery of a phonograph record at spaced points, an elongated member slidably mounted in said handle member and having an element spaced outwardly from said diverging portions for engaging the spindle hole of said record, means urging said diverging portions towards said element to effect a triangular grip on said record permitting handling of said record without touching its recording grooves, said handle member having a slot communicating said hollow with the lateral surface thereof, with said elongated member being biased outwardly from said handle member and having a notch therein, and further with said means urging said diverging portions towards said element including a lever member pivotally mounted within said slot and having a portion engaging said notch in said elongated member to retract said elongated member into the hollow of said handle member upon depression of said lever member, thereby triangularly gripping said phonograph record between said diverging portions and said element.

6. A phonograph record handling device, comprising means including a hollow handle member having oppositely diverging portions engaging the periphery of a phonograph record at spaced points, an elongated member slidably mounted in said handle member and having an element spaced outwardly from said diverging portions for engaging the spindle hole of said record, means urging said diverging portions towards said element to effect a triangular grip on said record permitting handling of said record without touching its recording grooves, with said handle member having an angular portion with a slot opening towards said diverging portions and said elongated member having a corresponding angular portion arranged extending from said slot and retractable therewithin; whereby triangularly gripping of said phonograph record between said diverging portions and said element can be effected.

7. A phonograph record handling device, comprising means including a hollow handle member having oppositely diverging portions engaging the periphery of a phonograph record at spaced points, an elongated member slidably mounted in said handle member and having an element spaced outwardly from said diverging portions for engaging the spindle hole of said record, means urging said diverging portions towards said element to effect a triangular grip on said record permitting handling of said record without touching its recording grooves, with said handle member having a rectangular aperture and said elongated member having a portion arranged extending within said aperture and retractable within said handle member, whereby triangularly gripping said phonograph record between said diverging portions and said element can be effected.

8. A phonograph record handling device, comprising means including an elongated member having at one end an element engaging the spindle hole of a phonograph record and at the other end a first angular portion having first means engaging the periphery of said record, means including a handle and a second angular portion pivotally connected at said other end of said elongated member to diverge oppositely from said first angularly portion and having a second means engaging the periphery of said phonograph record, and means biasing said second means towards said element to effect a triangular grip on said record permitting handling of said record without touching its recording grooves.

9. A phonograph record handling device, comprising means including an elongated member having at one end an element engaging the spindle hole of a phonograph record and spaced from said element a pair of pivotally mounted diverging members each having means engaging the periphery of said record, and means operatively connected with the opposite end of said elongated member pivoting said diverging members towards said element to effect a triangular grip on said record permitting handling of said record without touching its recording grooves.

References Cited by the Examiner

UNITED STATES PATENTS

| | | | |
|---|---|---|---|
| 2,563,350 | 8/1951 | McCombie | 274—1 |
| 2,723,877 | 11/1955 | Palmour et al. | 294—28 X |
| 3,169,789 | 2/1965 | Cohn | 294—16 |

NORTON ANSHER, *Primary Examiner.*

C. B. PRICE, *Assistant Examiner.*